United States Patent [19]
Kohl

[11] Patent Number: 5,051,019
[45] Date of Patent: Sep. 24, 1991

[54] SPACE FRAME ASSEMBLY

[76] Inventor: Rainer A. Kohl, Plot 76, Lynnwood Road, The Willows, Pretoria, Transvaal, South Africa

[21] Appl. No.: 297,390

[22] Filed: Jan. 17, 1989

[51] Int. Cl.⁵ .............................................. F16B 7/00
[52] U.S. Cl. .................... 403/171; 403/172; 403/217; 403/320; 403/296; 52/648; 52/81
[58] Field of Search ............... 403/171, 172, 176, 217, 403/296, 320; 52/648, 81

[56] References Cited

U.S. PATENT DOCUMENTS

| | | | |
|---|---|---|---|
| 2,584,640 | 2/1952 | Taylor | 403/296 |
| 3,632,147 | 1/1972 | Flinger | 403/176 |
| 3,789,562 | 2/1974 | DeChicchis et al. | 52/648 |
| 4,131,380 | 12/1978 | DeBliguy | 52/81 |
| 4,183,190 | 1/1980 | Bance | 52/648 |
| 4,313,687 | 2/1982 | Martinez Apeztegui | 403/320 |
| 4,444,523 | 4/1984 | Stumpf | 403/173 |
| 4,624,090 | 11/1986 | Steinen | 52/548 |
| 4,650,361 | 3/1987 | Seuster | 52/81 |
| 4,677,804 | 7/1987 | Holt | 52/648 |
| 4,692,054 | 9/1987 | Kirby | 52/648 |
| 4,763,459 | 8/1988 | Wesselski | 403/171 |

FOREIGN PATENT DOCUMENTS

| | | |
|---|---|---|
| 212214 | 10/1908 | Fed. Rep. of Germany . |
| 841351 | 6/1952 | Fed. Rep. of Germany . |
| 2305330 | 8/1973 | Fed. Rep. of Germany . |
| 2526660 | 12/1976 | Fed. Rep. of Germany . |
| 3246203 | 5/1984 | Fed. Rep. of Germany . |

Primary Examiner—Randolph A. Reese
Assistant Examiner—Carol I. Boras
Attorney, Agent, or Firm—Berman, Aisenberg & Platt

[57] ABSTRACT

A space frame node and connector assembly is provided in which the node is provided with a series of sockets each of which is formed into an inner and outer part, the inner part being screw-threaded for receiving a screw-threaded spigot portion of a connector and the outer part being of enlarged shape for co-operation with an enlarged spigot portion axially adjacent the screw-threaded spigot portion. Preferably the enlarged portion of the socket and co-operating enlarged portion of the spigot are of truncated conical shape such that the connector is firmly urged into the tapering enlarged socket formation when the screw-threaded spigot and socket are interengaged.

6 Claims, 2 Drawing Sheets

SPACE FRAME ASSEMBLY

FIELD OF THE INVENTION

This invention relates to space frames and components thereof and, in particular, space frames of the type composed of a system of generally straight frame members extending between connection points generally termed "nodes". Such space frames are used for a wide range of purposes, amongst others, as demountable exhibition frames and supports for products being exhibited, as the supports for space decking in elevated floors or roof structures or any other suitable application where a three-dimensional frame is required.

BACKGROUND TO THE INVENTION

Space frames are well known in various fields and, in particular, in the exhibition and display fields and in providing elevated floor or roof supports over reasonably extended areas.

Space frames generally comprise a large number of standard length frame members which extend between connection points which will hereinafter be termed "nodes" in a variety of different angles in order to form a three-dimensional frame structure. The connection of the ends of the frame members to the nodes has been achieved in a wide variety of different ways. One such way is by means of screw-threaded spigots carried on rotatable members held captive on the ends of the frame members and which co-operate with complementarily screw-threaded holes in the node. Adjacent the mouth of such hole there is usually a flat annular surface for engagement by a co-operating surface on the rotatable member carrying the screw threaded spigot. This type of arrangement operates satisfactorily but, in the applicant's view, does not have an adequate strength or resistance against bending forces applied transversely to the length of the frame members.

Other proposals have included the provision of hollow node members, generally in two or three parts, and to which the frame members can be attached by means of nuts or bolts tightened from the inside of the parts of the node member which are then secured together to form the completed node. This arrangement is generally inconvenient and suffers from a similar disadvantage to that outlined above.

It is the object of this invention to provide a space frame in which the frame members are secured to the node members in a more advantageous manner and, also, to provide a space frame assembly embodying such connections and having additional novel features.

SUMMARY OF THE INVENTION

In accordance with this invention there is provided a space frame node and connector assembly in which the space frame node has a plurality of connection sockets provided therein in which each connection socket is composed of a female screw-threaded portion located at the distal end and an enlarged socket portion located at the proximal end, and in which a connector member for co-operation therewith has a male screw-threaded portion for co-operation with said female screw-threaded portion and an enlarged spigot portion adapted for co-operation with said enlarged socket portion in order to provide an additional support to the connector member when lateral forces are applied thereto.

Further features of the invention provide for the enlarged spigot portion of the connector member to be of a truncated conical shape with the male screw-threaded portion extending axially from the narrow end thereof; for the truncated conical shape to carry at its larger end an hexagonal or other surface for engagement by a tool or for frictional manual engagement; and for the enlarged socket portion to be of a shape complementary to the co-operation zone of the enlarged spigot portion of the connector member. The truncated conical portion may be terminated at its larger diameter end by a shoulder formed by a larger diameter portion.

Conveniently the connector member has, at its end opposite the screw-threaded male portion, a locating spigot for location axially in a tubular frame member and this spigot preferably has a peripheral groove therein in order to retain the connector member in said tubular frame member by means of retaining fittings or the like.

Such retaining fittings can conveniently be press-fitted hard rubber fittings but may also be screw-threaded elements such as grub screws, ordinary headed screws or the like extending inwardly from the outside of the tubular frame member at an appropriate position.

Alternatively, the screw-threaded male portion may be defined by an outwardly projecting end of a bolt or screw passing through a hole in a separate part forming the said enlarged spigot portion. In this case the screw or bolt has a head co-operating with an inner stop surface, conveniently an end surface, formed on a locating spigot through which the bolt passes.

Such locating spigot may conveniently have a peripheral groove therein into which the wall of a tubular member can be deformed to retain it permanently therein. The separate part and the screw or bolt are rotatable substantially in unison and the said separate part is held captive on the screw or bolt. This may be achieved by the screw or bolt having a formation onto which the separate part clips to hold it captive thereon or, alternatively, the separate part may have slots passing diametrically therethrough which receive a diametrically extending pin passing through a transverse hole in the bolt or screw.

Whilst the connector member will, generally speaking, assume the form in which it has a locating spigot extending from its larger end for connection to a tubular frame member, it may assume a number of different forms for other articles to be attached to the node. Thus, for example, the larger end of the connector member could simply be slotted for receiving an end portion of a panel, for example a glass panel; it could be extended and be provided with a deep screw-threaded socket for receiving a screw-threaded spigot carrying a foot thereby defining an adjustable foot assembly; or it could have a corner formation for receiving a glass or other panel attached thereto.

Various other fittings and accessories can be provided in order to enable a space frame assembly made according to this invention to be used for various purposes and, in particular, as a display or exhibition assembly.

It is a particular feature of this invention that the components of the space frame being primarily the nodes and connector members are intended to be embraced within the scope of the invention irrespective of whether or not they are sold in combination with each other or separately. Accordingly, the invention also provides connector members and node members independently of each other.

In order that the invention may be more fully understood and the various accessories and variations of the invention may be appreciated one example thereof will now be described in application to an exhibition or display assembly. It must, however, be understood that the scope of the invention is in no way limited to such an application and the invention is intended to apply just as well to roof or floor decking supporting space frames.

DETAILED DESCRIPTION WITH REFERENCE TO THE DRAWINGS

Referring firstly to FIGS. 1 to 4, the invention provides a system in which node members 1, conveniently of a solid construction, are adapted to interconnect straight frame members 2 by means of connector members 3.

Figure 1:
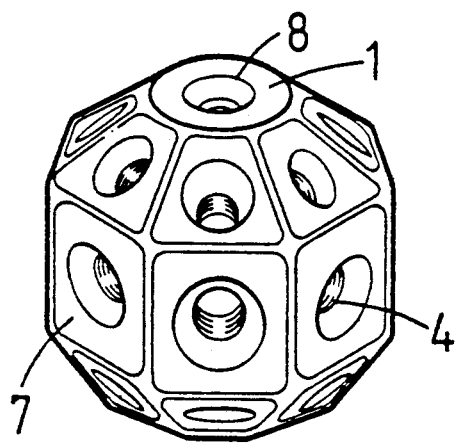
FIGS. 1. and 2 are each perspective views of two different forms of node according to the invention.

The node members may take various different forms, each of the forms being adapted to provide a variety of different connection positions and relative directions of the connector members 3 and frame members associated therewith relative to the node members. Thus, as illustrated in FIG. 1, a node member could provide sockets 4 having axes directed so as to enable frame members to be connected at both right angles and 45° to each other in three dimensions, the cross-section through such node member thus being octagonal. Such cross-section is shown clearly in FIGS. 3, 4 and 9.

Figure 2:
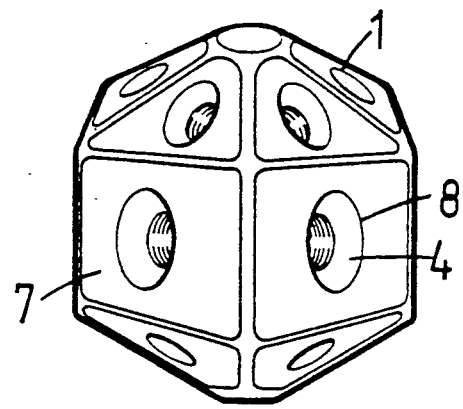

Alternatively, as illustrated in FIG. 2, the sockets 4 may be adapted to connect frame members at 60°, 120°, and 180° relative to each other, thereby being adapted to form a well known space frame configuration based on the equilateral triangle system. Clearly, node members could be provided with any other alternative arrangement of connection sockets 4. Such arrangements will be apparent to those skilled in the art.

As provided by this invention the connection sockets 4 each comprise a female screw-threaded portion 5 located at the inner end of an enlarged socket portion 6 communicating with the outer surface 7 of the node member. The enlarged socket portion 6 is made to a truncated conical shape as shown clearly in FIG. 3 and thus provides a circular periphery 8 defining a mouth to the connection socket. The connector members 3 for co-operation with such node members each have a male screw-threaded portion 9 extending axially from a narrow end of a truncated conical shaped spigot portion 10 which communicates with an hexagonal formation 11 whereby the connector member can be rotated using a spanner. The portion 12 of the connector member adjacent the male screw-threaded portion 9 is made to conform in shape to the shape of the enlarged socket portion 6 of the connection socket and the male screw-threaded portion is adapted to screw into the female screw-threaded portion 5 in each case.

Figure 3:
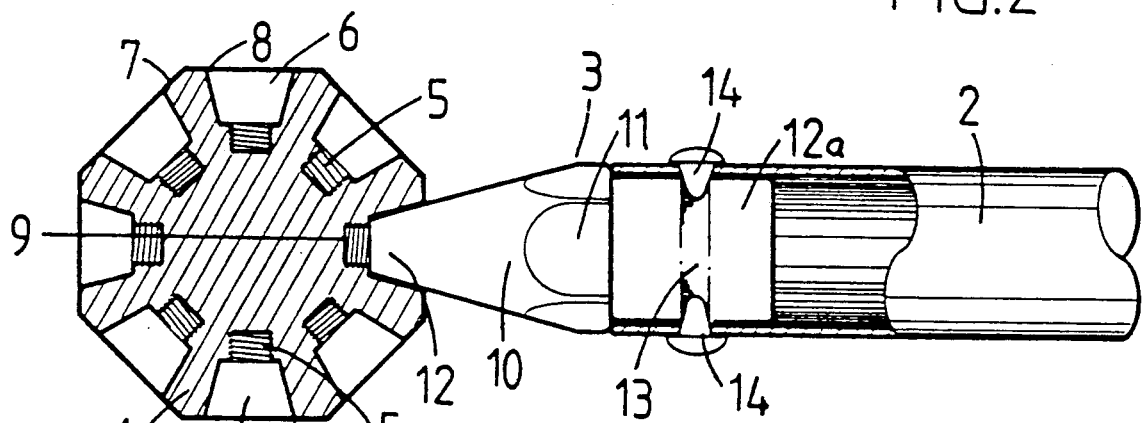
FIG. 3 is a sectional view illustrating one form of connector member in engagement with a node and a tubular frame member.

As shown clearly in FIG. 3 the periphery of the enlarged socket portion 6 of the connection socket therefore forms a support against forces exerted in a direction transverse to the axis of the connector member in use. This support is achieved at a distance spaced from the screw-threaded portions and, accordingly, lower bending stresses are generated for equivalent transverse loads so that a much stronger connection results.

Figure 4:
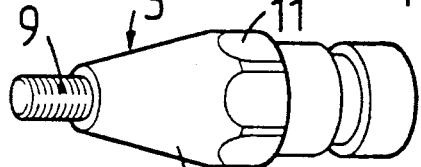
FIG. 4 is an isometric view of the connector member of FIG. 3 alone.

The connector member may take a variety of different forms, one such form being illustrated in FIGS. 3 and 4 in which it is provided with a locating spigot 12a extending axially from the larger end of the connector member. The locating spigot 12a has a circumferential groove 13 in its outer surface and, in use, it is fitted into the end of a tubular frame member 2. The tubular frame member has perforations allowing for the radial introduction of locating members 14 which, in this case, are conveniently made of hardened rubber or the like. However, any other locating members can be employed, such as grub screws, flat headed screws or even suitable pins. In any event the purpose of the locating member 14 is to hold the connector member captive relative to the frame member whilst allowing relative rotation thereof. In this manner the frame member can be attached to a node member by rotating the connector member without rotating the frame member.

Figure 5:
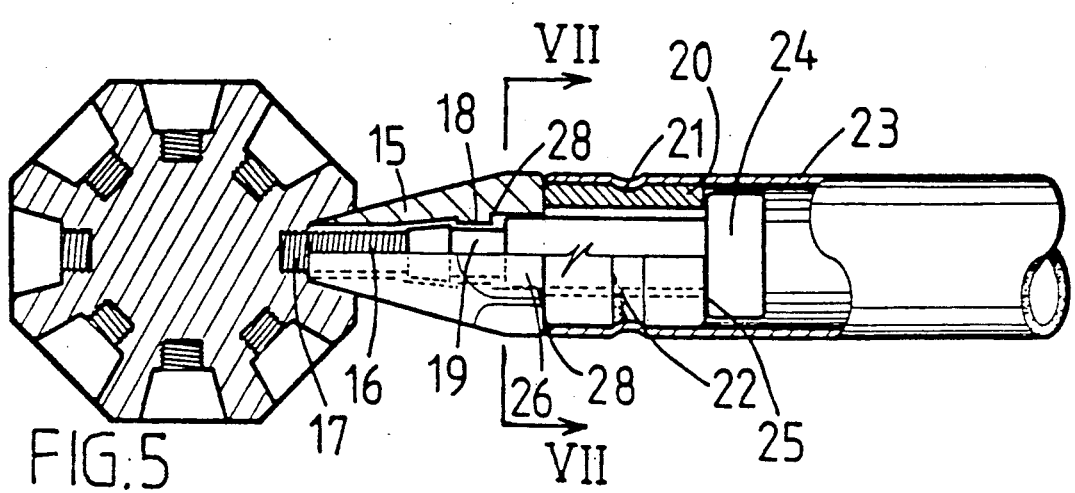
FIG. 5 is a view similar to FIG. 3 but of another form of the invention.
Figure 6:
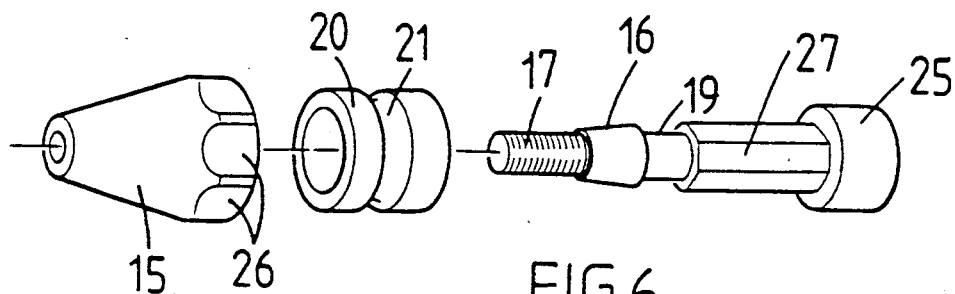
FIG. 6 is an exploded view of the connector FIG. 5.
Figure 7:
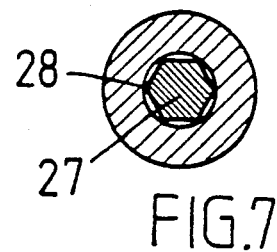
FIG. 7 is a cross-section taken along line VII—VII in FIG. 5.

An alternative form of connector member is illustrated in FIGS. 5 to 7. In this case the enlarged spigot portion 15 is defined by a separate part which can conveniently be moulded of a synthetic plastics material and through which passes a specially formed bolt 16. The bolt has a screw-threaded end 17 extending out of the separate part and defining the screw-threaded spigot. An inwardly directed shoulder 18 within the bore through the separate part locates the part captively on the bolt which is provided with a co-operating grooved section 19 therein.

The bolt passes through a retaining spigot 20 having a peripheral groove 21 therein and into which the wall 22 of the tubular frame member 23 is deformed in order to hold the retaining spigot in the frame member permanently. A head 24 on the bolt, co-operates with the innermost end surface 25 of the retaining spigot to hold the bolt therein. Once more hexagonal formations 26 are provided on the outer surface of the separate part 15. The separate part is rotatable in substantial unison with the bolt by virtue of the bolt having a hexagonal cross-sectional shape as indicated by numeral 27 towards its headed end and which cooperates with a co-operating complementarily shaped part 28 of the bore through the separate part. This is shown most clearly in FIG. 7.

Figure 8:
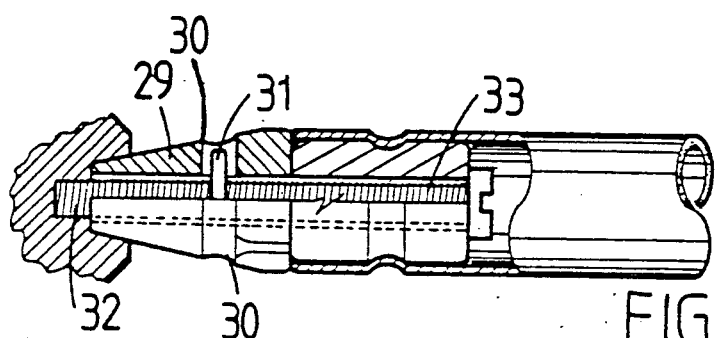
FIG. 8 is a view similar to FIG. 3 by a third form of the invention.

A further alternative arrangement is illustrated in FIG. 8 in which the arrangement is substantially similar to that described with reference to FIGS. 5 to 7 apart from the fact that the separate part 29 has a transverse hole 30 therethrough which accommodates, loosely a pin 31 passing through a transverse hole in the bolt 32. In this case a simple screw-threaded bolt 33 can be employed thereby avoiding the manufacture of a special bolt as illustrated in FIG. 6.

Figure 9:
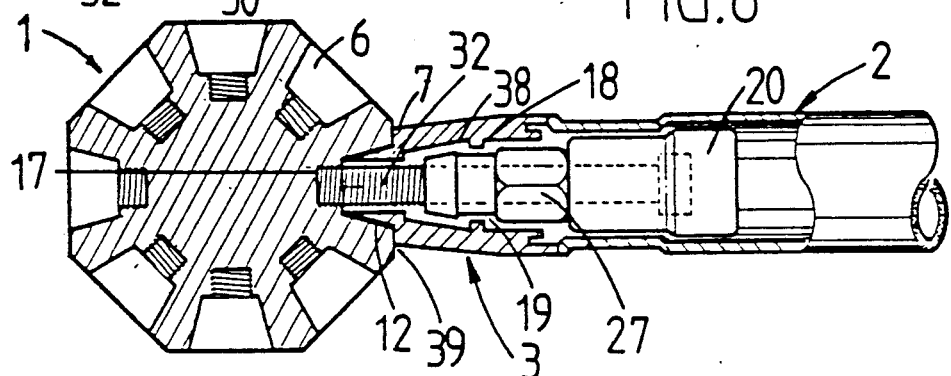
FIG. 9 is a view of another form of the screw threaded male portion and spigot portion of the connector member.

The screw threaded spigot shown in FIG. 9 differs from the constructions illustrated in FIGS. 5 to 7 in that the retaining spigot 20 is not formed integrally with the male screw threaded portion in the form of bolt 32. In this instance the connector member must be rotatable in the frame member 2 which, though desirable, is not essential with the constructions shown in FIGS. 5 to 7 and 8. The truncated conical enlarged spigot portion 38 in this example has a shoulder 39 which bears against the face of the node 1, the portion 12 again engaging with the enlarged conical socket portion 6 of the node. The same reference numerals as have been used in other figures indicate similar parts.

It will be understood that the truncated conical surface in each case co-operates with the enlarged portion of the socket to firmly anchor the connector member therein and, in the latter two cases, the retaining spigot is firmly clamped against the separate part forming the enlarged portion of the spigot to thereby ensure a firm and rigid connection.

In particular, it is a feature of the invention in its preferred embodiments that the included angle of the conical portion is smaller than the "friction angle" (of which the coefficient of friction is the tangent) between the conic portions. This conical spigot portion therefore wedges, jams or sticks in the conical socket portion to thus carry some proportion of tensile loads exerted on the connection so that the threaded portions do not have to do the whole work. This advantage thus accrues in addition to the enhancement of bending strength.

The connector member may also take a number of other forms depending on articles to be attached to or supported by the node members.

Figure 10:
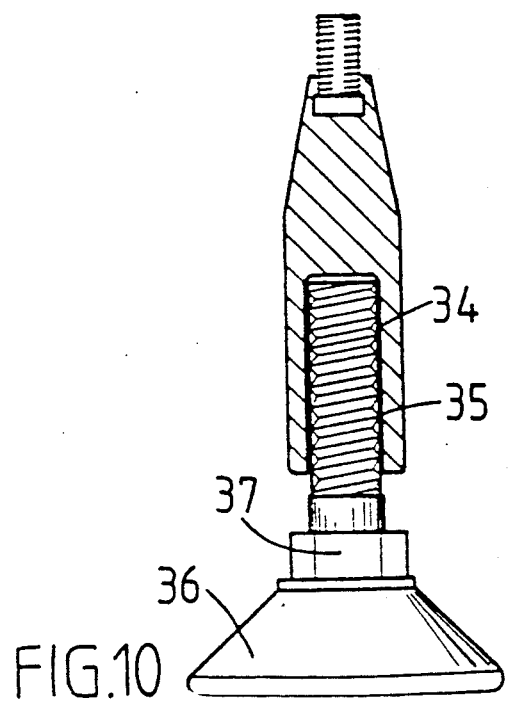
FIG. 10 is a sectional elevation of a connector member defining an adjustable foot assembly.

Thus, as shown in FIG. 10, the connector member may be of an elongate configuration having a long screw-threaded socket 34 therein which receives a screw-threaded shank 35 which holds a supporting foot 36 for a frame assembly. The foot 36 is therefore adjustable by rotating the shank and the whole frame assembly can be adjusted according to the supporting surface. Adjustment is preferably achieved using a spanner engaging an hexagonal formation 37 associated with the shank 35.

Various other fittings and accessories can be provided in order to extend the versatility of the space frame provided by this invention as indicated above and as will be apparent to those skilled in the art.

It will be understood that numerous variations may be made to the above described embodiments of the invention without departing from the scope hereof. In particular, the configuration of the connection sockets in the nodes could be changed quite appreciably so long as lateral support is provided to connector members which are adapted to render such lateral support against forces exerted transverse to the axis of frame members secured thereby.

The invention therefore provides a useful and strong space frame structure with numerous different accessories and variations.

I claim:

1. A space frame node and connector assembly in which the space frame node has a plurality of connection sockets provided therein in which each connection socket is composed of a female screw-threaded portion located at the distal end and an enlarged socket portion located at the proximal end, and in which the connector member for cooperation therewith has a male screw-threaded portion for cooperation with said female screw-threaded portion and an enlarged spigot portion adapted for co-operation with said enlarged socket portion to firmly anchor the connector member therein in order to provide an additional support to the connector member when lateral forces are applied thereto; the enlarged socket portion having complementary conical shape to the enlarged spigot portion of the connector member, and the included angle of the conical shape being less than the friction angle of which the coefficient of friction between the socket portion and the spigot portion is the tangent.

2. A space frame node and connector assembly as claimed in claim 1, in which the connector member has a retaining spigot at its end opposite the male screw-threaded portion for locating axially in a tubular frame member, the spigots and enlarged portion forming a unitary construction.

3. A space frame node and connector assembly as claimed in claim 1, in which the male screw-threaded portion is defined by an outwardly projecting end of a screw passing through a hole in a separate part forming the said enlarged spigot portion and the screw has a head co-operating with an inner stop surface formed on a retaining spigot through which the bolt passes.

4. A space frame node and connector assembly as claimed in claim 3, in which the separate part and screw are rotatable substantially in unison and the said separate part is held captive on the screw.

5. A space frame node and connector assembly as claimed in claim 4, in which the screw and separate part are given inter-engaging hexagonal parts to be rotatable in unison and the separate part an inwardly directed shoulder locating captively with a circumferential groove on the screw.

6. A space frame node and connector assembly as claimed in claim 1, in which the enlarged spigot portion has a truncated conical portion terminated at a larger diameter end of the portion by a shoulder which bears against the face of the node when connected.

* * * * *